Dec. 9, 1930.  E. KALLENBACH  1,783,966
BRAKE FOR SLEDS
Filed April 10, 1928
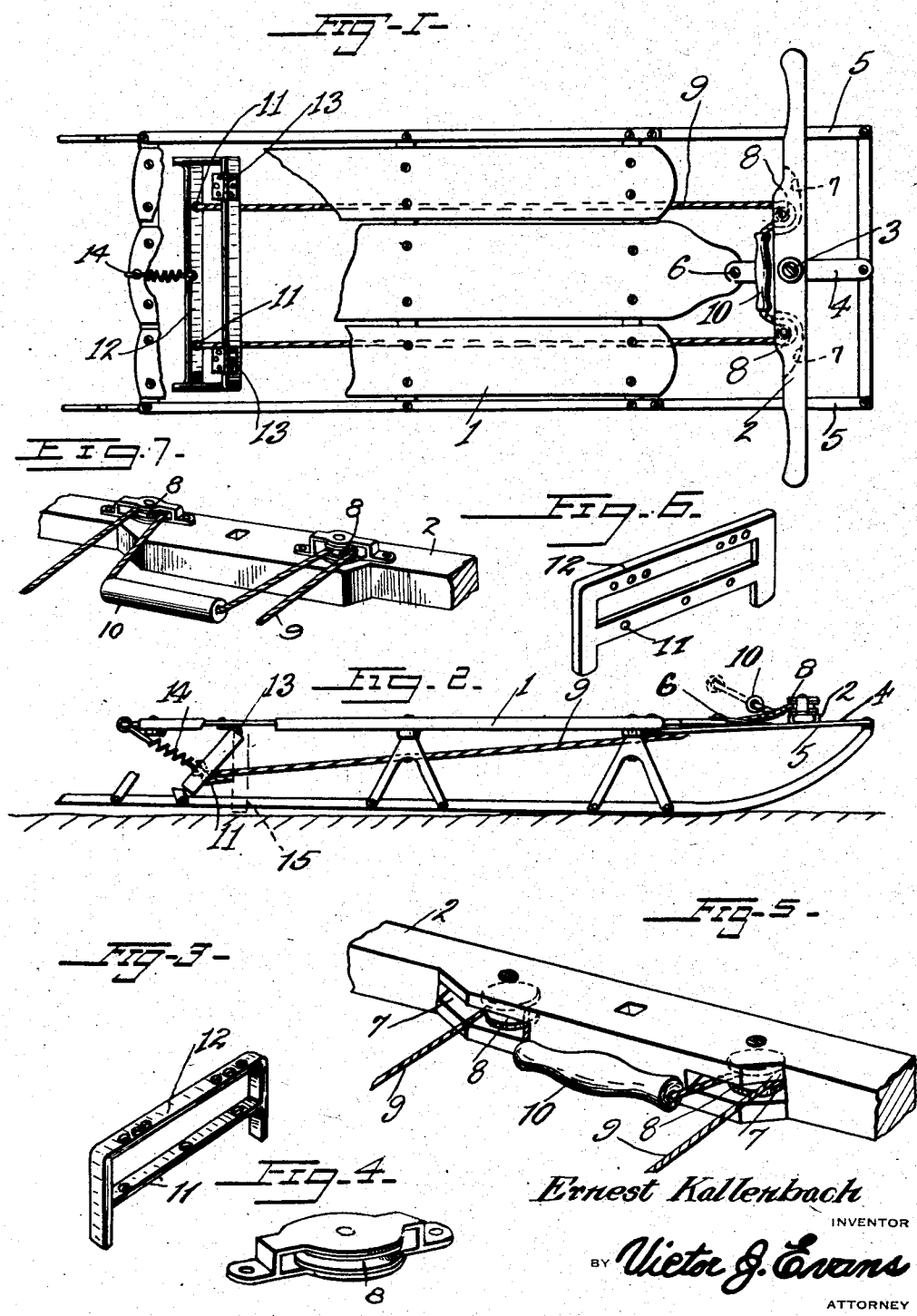
Ernest Kallenbach
INVENTOR
BY Victor J. Evans
ATTORNEY Patented Dec. 9, 1930

1,783,966

UNITED STATES PATENT OFFICE

ERNEST KALLENBACH, OF PHILADELPHIA, PENNSYLVANIA

BRAKE FOR SLEDS

Application filed April 10, 1928. Serial No. 268,957.

The present invention relates to sleds and more especially to an improved brake therefor for the purpose of retarding the speed of the sled.

The invention has for its purpose to provide an improved brake, hingedly suspended from the top of the sled at the rear and between the runners, with tensioning means between the brake and the rear of the top of the sled to normally hold the brake from engagement with the snow or ice, in combination with means connected to the brake member and manually actuated so as to move the brake member downwardly and in engagement with the ice or snow in order to retard the speed of the sled.

It is to be understood that the particulars herein given are in no way limitive, and that while still keeping within the scope of the invention, any desired modification of details and proportions may be made in the construction of the appliance according to circumstances.

The invention comprises further features and combination of parts to be hereinafter set forth, shown in the drawings and claimed.

In the drawings:—

Figure 1—is a plan view of a sled, showing a part of the top broken away and illustrating the brake member suspended in position and the operating means connected thereto.

Figure 2—is a view in side elevation of the sled, showing the brake member suspended in position, the same being shown in dotted lines as engaging with the ice or snow, and showing a modified form of means for actuating said brake member.

Figure 3—is a perspective view of the brake member.

Figure 4—is a detailed view of one of the pulleys in Figure 2.

Figure 5—is a view of the steering bar in Figure 1, where the pulleys are mounted in chambered out parts.

Figure 6—is a modified brake member.

Figure 7—is a perspective view of the steering bar shown in Figure 2.

Referring to the drawings, 1 identifies a sled of conventional construction, and which is provided with the usual steering bar 2, used for flexing the forward ends of the runners. This steering bar is rigidly mounted at 3 on a link 4, said mounting being the well-known conventional design for flexing runners 5. By oscillating the bar 2 in a horizontal plane the two runners are caused to flex in either direction.

Carried by the steering bar are pulleys 8, over which a suitable rope, cable or the like 9 engages. These pulleys, while they may be any construction or design, are preferably housed as more clearly illustrated in Figures 5 and 7 to prevent disengagement of the rope. The loop part of the cable carries a handle 10, while the end portions of the rope pass rearwardly and are connected at 11 to a brake member 12, which is hingedly suspended at 13 from the under side of the top of the sled. The brake member 12 is under tension of a coil spring 14, which is connected to the brake member and in turn to the rear portion of the top of the sled, tending to hold the brake member in position shown in full lines in Figure 2.

By grasping the member 10 the operator may pull upon the rope, the loop part of the rope moving rearwardly, the rollers turning, the rear end portions of the rope will pull upon the brake member and move it against the action of the spring 14 to the dotted line position shown at 15 in Figure 2, thereby dragging on the ice or snow and hence retarding the speed of the sled.

Referring to Figure 5 it is to be noted that the pulleys are mounted in chambered out parts 7 of the steering bar 2.

The invention having been set forth, what is claimed is:

1. The combination with a sled having a steering bar, of a dragging brake member suspended from the top of the sled between the runners at the rear thereof, means to retain the brake member normally inclined rearwardly and downwardly, said steering bar having chambered out parts, pulleys mounted in the chambered out parts, a rope engaging over the pulleys and having a loop including a handle rearwardly of the pulleys, said loop having its opposite portions connected to the brake member, whereby upon grasping the handle the rope may be pulled and the brake member applied.

2. The combination with a sled having a steering bar, of a brake member hingedly supported at the top of the sled between the runners and normally inclined downwardly and rearwardly, said brake member comprising a rectangular open structure consisting of the side pieces, the terminals of which drag upon the ground and two cross pieces connecting the side pieces, one of the cross pieces being headed to the under surface at the top of the sled, a tensioning spring connected to the other cross piece centrally thereof and in turn connected to the rear of the top of the sled, a rope formed in a loop at one end of the sled and having pulley connections with the steering bar, and its opposite ends extending rearwardly and connected to the other cross piece of the brake member, and the handle carried by the loop at a point to the rear of the steering bar, whereby upon grasping the handle and pulling upon the loop the brake member may be applied.

In testimony whereof he affixes his signature.

ERNEST KALLENBACH.